United States Patent
Liu (10) Patent No.: US 10,605,294 B2
(45) Date of Patent: Mar. 31, 2020

(54) THREADED-CONNECTION ANTI-LOOSENING LOCKING DEVICE

(71) Applicant: GUANGZHOU SHINEDASON MANUFACTURE CO., LTD., Guangzhou (CN)

(72) Inventor: Yanwei Liu, Guangzhou (CN)

(73) Assignee: GUANGZHOU SHINEDASON MANUFACTURE CO., LTD., Guangzhou, Guangdong (CN)

(*) Notice: Subject to any disclaimer, the term of this patent is extended or adjusted under 35 U.S.C. 154(b) by 42 days.

(21) Appl. No.: 15/955,638

(22) Filed: Apr. 17, 2018

(65) Prior Publication Data

US 2018/0231048 A1 Aug. 16, 2018

Related U.S. Application Data

(63) Continuation of application No. PCT/CN2016/097080, filed on Aug. 28, 2016.

(30) Foreign Application Priority Data

Oct. 20, 2015 (CN) .......................... 2015 1 0684271

(51) Int. Cl.
*F16B 39/24* (2006.01)
*F16B 39/10* (2006.01)
(Continued)

(52) U.S. Cl.
CPC .............. *F16B 39/24* (2013.01); *F16B 39/10* (2013.01); *F16B 39/282* (2013.01); *F16B 43/00* (2013.01)

(58) Field of Classification Search
CPC .................................. F16B 39/24; F16B 39/26
(Continued)

(56) References Cited

U.S. PATENT DOCUMENTS 5,626,449 A * 5/1997 McKinlay ............. F16B 39/282
411/136
5,688,091 A * 11/1997 McKinlay ............. F16B 39/282
411/136
(Continued)

FOREIGN PATENT DOCUMENTS

| CN | 202579581 U | 12/2012 |
| CN | 103062200 A | 4/2013 |

(Continued)

OTHER PUBLICATIONS

Guangzhou Shinedason Manufacture Co. Ltd., International Search Report and Written Opinion, PCT/CN2016/097080, dated Dec. 1, 2016, 17 pgs.
(Continued)

*Primary Examiner* — Gary W Estremsky
(74) *Attorney, Agent, or Firm* — Morgan, Lewis & Bockius LLP (57) ABSTRACT

A threaded-connection anti-loosening locking device includes: a bolt (4) having an external thread screw, a nut (3) having an internal thread, a locking member for locking rotation of the nut on the bolt, and a locking pad (1) for further limiting rotation of the locking member. By means of matching of the locking member and the locking pad (1), the rotation of the nut can be prevented by utilizing the matching relationship of mutual locking during vibration, and the current fixation relationship can be prevented from being loosened.

10 Claims, 6 Drawing Sheets

(51) Int. Cl.
*F16B 39/282* (2006.01)
*F16B 43/00* (2006.01)

(58) Field of Classification Search
USPC .......................................... 411/136, 144–149
See application file for complete search history.

(56) References Cited

U.S. PATENT DOCUMENTS

| 6,896,465 | B2 * | 5/2005 | Andersson | ............ | F16B 39/282 |
|---|---|---|---|---|---|
| | | | | | 411/149 |
| 8,459,919 | B2 * | 6/2013 | Ehrler | .................... | F16B 39/26 |
| | | | | | 411/149 |

FOREIGN PATENT DOCUMENTS

| CN | 105179433 A | 12/2015 |
|---|---|---|
| JP | 2014219046 A | 11/2014 |
| TW | I277701 B | 4/2007 |

OTHER PUBLICATIONS

Guangzhou Shinedason Manufacture Co. Ltd., International Preliminary Report on Patentability, PCT/CN2016/097080, dated Apr. 24, 2018, 6 pgs.

* cited by examiner

THREADED-CONNECTION ANTI-LOOSENING LOCKING DEVICE

PRIORITY CLAIM AND RELATED APPLICATION

This application is a continuation of PCT/CN2016/097080, entitled "THREADED-CONNECTION ANTI-LOOSENING LOCKING DEVICE" filed on Aug. 28, 2016, which claims priority to Chinese Patent Application No. 201510684271.8, filed with the State Intellectual Property Office of the People's Republic of China on Oct. 20, 2015, and entitled "THREADED-CONNECTION ANTI-LOOSENING LOCKING DEVICE", both of which are incorporated herein by reference in their entirety.

FIELD OF THE TECHNOLOGY

The present disclosure relates to the field of bolt fixation, and in particular to a locking device suitable for preventing looseness of a nut under low torque conditions

BACKGROUND OF THE DISCLOSURE

Currently, the threaded connection locking and locking technology applied to bolts and nut structures on the market is based on the national standard torque, or is based on the national standard torque, and researches on locking and locking of threaded connections, including mats Pieces, hex nuts, screw type, etc. However, the real challenge to the locking and locking of the threaded connection comes from the problem of low torque, especially the looseness of low torque in a vibrating environment. In the actual production process, the threaded connection in a very large number of conditions, including soft substrates, stainless steel bolts, etc., does not allow the application of large torque on the threaded connection, while the threaded connection is often facing a huge vibration, against the loose Locking requirements are particularly high. Therefore, how to solve the problem of loosening and locking of the thread connection with low torque, and how to solve the problem of locking and locking of the threaded connection in a vibration environment have been an international technical problem.

SUMMARY

A threaded-connection anti-loosening locking device related to the present disclosure includes: a bolt having a screw with external threads; a nut having internal thread and threaded connection with the screw; and a locking member includes a cylinder with a through hole, an axial cross-sectional shape and size of the through hole correspond to the axial cross-sectional shape and size of the outer surface of the nut, and a buckle is disposed at an end of the cylinder. a locking ring at the cylinder port, a circular hole with the same outer diameter as the screw is arranged at the center of the locking ring, and a gripping pattern is provided on a side of the locking ring away from the cylinder; a locking washer, including the washer hole with the same outer diameter as the screw provided in the center, can lock with one another after being provided with a gripping pattern contact with the locking ring on one side of the locking washer. Anti-skid lines that rotate around the circumference.

Further, the axial length of the through hole of the cylindrical body is greater than or equal to half of the axial length of the nut or its axial length.

Further, the outer surface of the cylinder body is cylindrical, and the locking member is a circular member corresponding to the outer shape of the cylinder body.

Further, the gripping pattern on the locking ring is composed of a plurality of stepped gear stairs evenly distributed around the circular hole, and the stepped gear stair includes upward extending from the surface of the locking ring. An inclined plane, and a section perpendicular to the surface of the locking ring from the top end of the inclined plane.

Further, the gripping pattern on the locking washer corresponds to the shape of the stepped gear stair on the locking ring, and the rising angle of the ramped surface is the same, but the rotation directions of the stepped gear stairs of the two are opposite.

Further, the outer surface of the nut is hexagonal, and the axial cross-sectional shape of the through hole of the locking member is a hexagonal shape that matches the shape of the outer surface of the nut.

Further, the locking washer is far from a side of the cylinder, and is provided with a gripping pattern that improves the ability to grip the substrate.

Further, the gripping pattern includes a plurality of wedge-shaped racks. The wedge-shaped racks are formed by outward projection of the surface of the locking washer. The wedge-shaped racks are uniformly distributed in the locking washer. On the surface, and the axis of each of the wedge-shaped racks passes through the center of the lock washer.

Further, a annular concave ring is disposed at one end of the cylinder body where the locking ring is mounted, and a groove arranged in an interval is arranged on the outer circumference of the annular concave circle, and the outside of the locking ring is provided. A locking bar corresponding to the shape and size of the groove is arranged on the circumference, and after the locking ring is installed in the annular concave ring, the locking bar is locked into the groove respectively.

Further, a annular concave ring is provided at one end of the cylinder body where the locking ring is mounted, the outer circumference of the annular concave circle is an inner polygon, and the outer circumference of the locking ring is the ring-shaped ring. An outer polygonal shape corresponding to the outer circumferential shape of the concave ring, after the locking ring is installed in the annular concave ring, the annular concave circle defines the rotation of the locking ring in the circumferential direction through the inner polygonal shape.

In the present disclosure, the cooperation of the locking member and the locking washer utilizes the mutual locking relationship to limit the rotation of the nut during vibration, prevent the looseness of the current fixing relationship, and improve the fixing effect of the fixing point. Moreover, the structure of the present disclosure is simple, and the corresponding locking structure can be replaced according to different fixing requirements.

BRIEF DESCRIPTION OF THE DRAWINGS

To describe the technical solutions of the embodiments of the present disclosure or the existing technology more clearly, the following briefly introduces the accompanying drawings required for describing the embodiments or the existing technology. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

Figure 1:
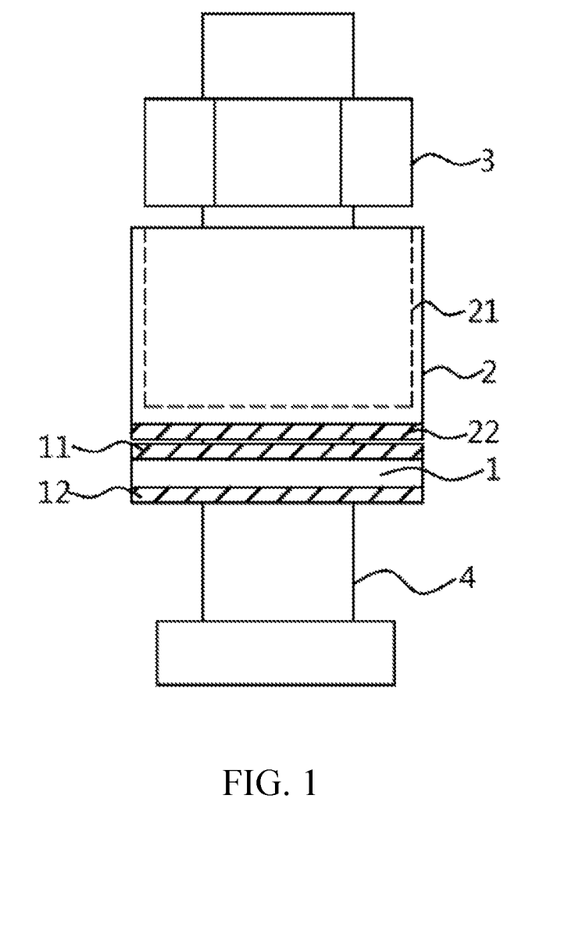
FIG. 1 is a schematic structural diagram of a locking device according to an embodiment of the present disclosure.

As shown in FIG. 1, the threaded-connection anti-loosening locking device of the present disclosure generally includes a bolt 4 having a male screw, a nut 3 having an internal thread and capable of forming a threaded connection with the bolt 4, and a locking member that rotates on the bolt 4 and locks the nut 3, and a locking washer that defines the rotation of the locking member.

Figure 2:
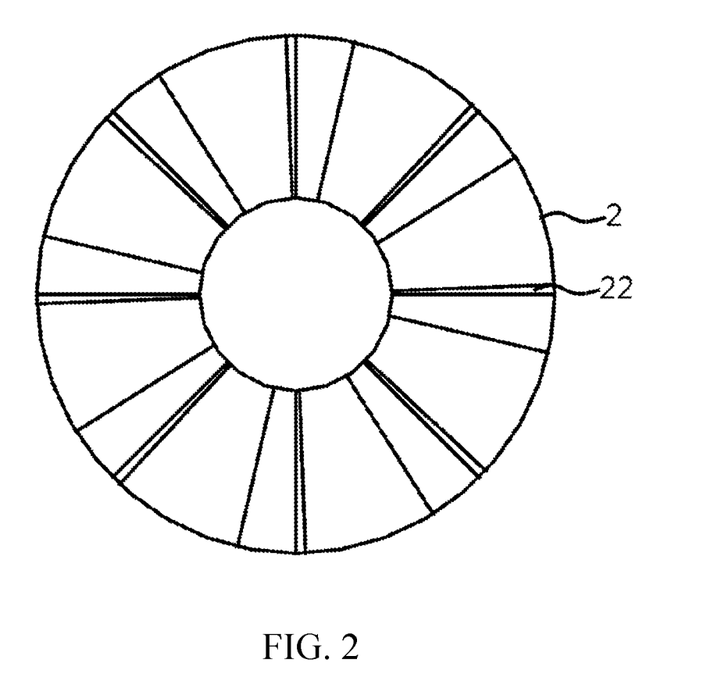
FIG. 2 is a schematic view of a step-shaped gear stage of the cylinder shown in FIG. 1.

The locking member includes a cylindrical body 2 having a through hole 21 whose axial cross-sectional shape and size correspond to the axial cross-sectional shape and size of the outer surface of the nut 3 so that the nut 3 can enter the through hole 21. One end of the cylindrical body 2 is provided with a lock ring 25 sealed at the end of the cylindrical body 2. The center of the lock ring 25 is provided with a round hole 27 having the same outer diameter as the screw so that the locking member can be put on the bolt 4. As shown in FIG. 2, a gripping pattern is provided on the surface of the lock ring 25 away from the cylindrical body 2.

The locking washer 1 includes a washer hole 13 provided in the center portion and having the same outer diameter as the bolt 4, so that the locking washer 1 can be put on the bolt 4. On one side of the locking washer 1 is provided with a lock. The gripping pattern of the lock ring 25 can mutually lock the nut from rotating in the circumferential direction.

When used, the bolt 4 is entered through the fixing hole of a component to be fixed, and then a locking heat plate is sleeved on the bolt 4 from the other end. The cylindrical body 2 is then put on the bolt 4 and the opening of the through hole on the cylinder body 2 is opened. One end is located on the side away from the component to be fixed, and the nut 3 is finally put on the bolt 4. The nut 3 enters the through hole 21 with the twisting. The length of the through hole 21 of the cylindrical body 2 in the axial direction may be greater than or equal to the axial length or half of the nut 3, i.e., the cylindrical body 2 may accommodate the entire nut 3 or accommodate half of the nut 3, so as to form a stable clamping relationship towards the nut 3. One side of the lock washer 1 is in contact with the component to be fixed, and the other side of the lock washer 1 is in contact with one end of the lock ring 25 of the cylindrical body 2 having a gripping pattern through the anti-slip streaks, and the interlocking of the two forms a mutual lock.

According to the above structure, the vibration of the component to be fixed is transmitted to the locking member, and the mutual locking by the locking member can not only reduce the vibration, but also avoid the rotation of the locking member, thereby preventing the nut 3 from rotating.

In order to improve the locking effect, the gripping pattern on the lock ring 25 includes a plurality of stepped gear stairs 22 that are uniformly distributed on the surface with the circular hole 27 as a center. The stepped gear stair 22 may include a ramp extending upward from the surface of the lock ring 25, and a cross section perpendicular to the surface of the lock ring 25 from the top of the ramp. The radial width of the ramp may be the same as the radial width of the lock ring 25.

The stepped gear stairs 22 on this surface may not be connected to each other, i.e., the section of a latter stepped gear stair 22 is close to the ramping starting end of a preceding stepped gear stair 22. The specific number of the stepped gear stairs 22 can be set according to the size of the locking member. When the number of stepped gear stairs 22 is set on the conventional bolt 4, the stepped gear stairs 22 on the lock ring 25 can be set 5-7.

Further, the gripping pattern on the lock washer 1 may be a structure matched with the profile of the stepped gear stair 22, such as a block projecting from the surface of the lock washer parallel to the sectional surface, or recessed in the lock. It is also possible to use the same stepped gear structure 11 as the stepped gear stairs 22, and the ramping angles of both of them may be the same. But in order to form a mutual lock state, the rotation direction of the stepped gear structure 11 on the lock washer 1 needs to be opposite to the rotation direction of the stepped gear stair 22.

In order to increase the gripping force of the locking washer 1 and the component to be fixed, a gripping pattern capable of improving the ability to grip the contact surface may be provided on the other side of the locking washer 1 opposite to the side on which the gripping pattern is disposed. The gripping pattern can increase the friction of the locking washer 1 and the contact surface of the component to be fixed, prevent the locking washer 1 from rotating or reduce the rotation of the locking washer 1, and thus improve the effect of the locking member restricting the rotation of the nut 3.

The specific gripping pattern may adopt the structure of a wedge-shaped rack 12, which is formed by the outward projection of the surface of the locking washer 1. A plurality of wedge-shaped racks 12 are evenly distributed on the surface of the locking washer 1. The small-diameter end of each wedge-shaped rack 12 is close to the washer hole 13 of the locking washer 1, and the large-diameter end is close to the locking washer 1. The outer circumference, and the axis of each wedge-shaped rack 12 passes through the center of the lock washer 1. By forming the wedge-shaped rack 12 of the concave-convex structure, the frictional effect with the contact base can be increased.

Note that the outer surface of the nut 3 involved in this embodiment is hexagonal, and the axial cross-sectional shape of the through-hole 21 of the cylindrical body 2 is a hexagonal shape matched with the outer surface of the nut 3. Through the surface contact, the contact effect between the through hole 21 and the nut 3 can be improved, and the purpose of limiting the rotation of the nut 3 can be better achieved. In other embodiments, the shapes of the nut 3 and the through hole 21 may also be other numbers of polygons, such as a pentagon, an octagon, and the like.

In addition, the outer surface of the cylindrical body 2 may be cylindrical, rectangular or polygonal. The shape of the locking washer 1 may correspond to the outer shape of the cylindrical body 2.

Figure 3:
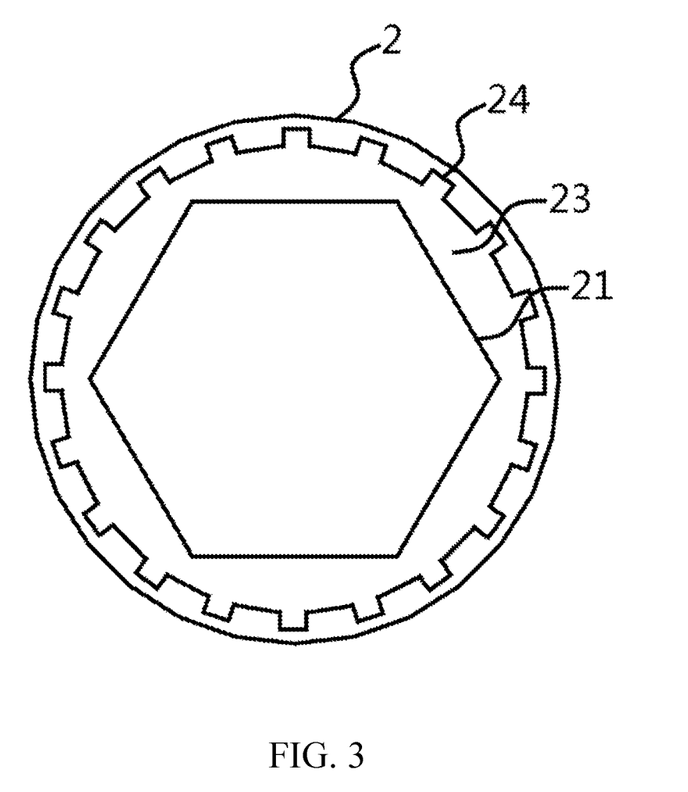
FIG. 3 is a schematic view of a cylinder structure according to an embodiment of the present disclosure.
Figure 4:
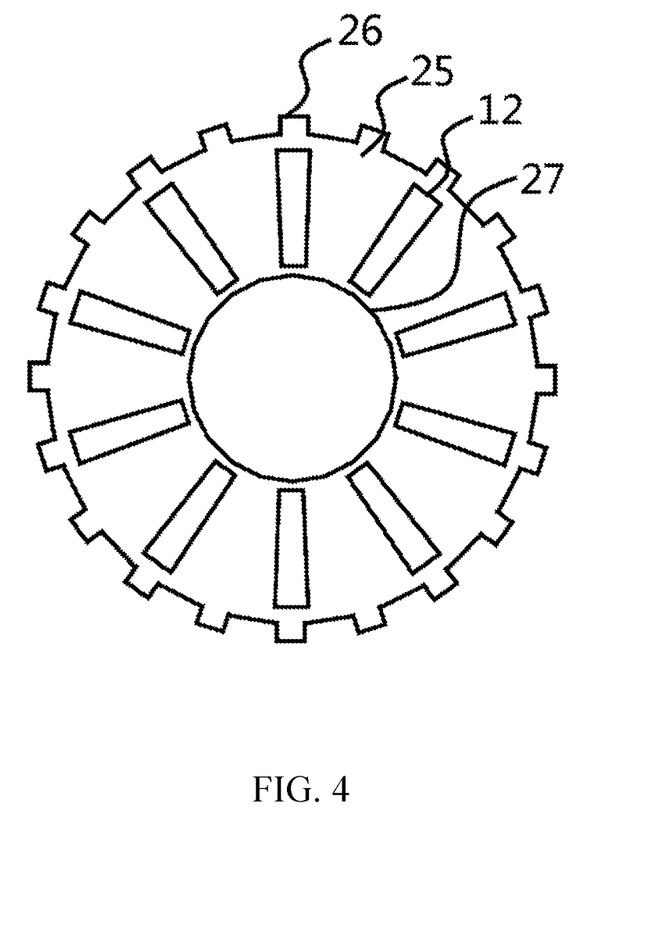
FIG. 4 is a schematic structural view of a locking ring engaged with the cylinder structure shown in FIG. 3.

As shown in FIGS. 3 and 4, in order to facilitate the replacement of the worn locking member, in an embodiment of the present disclosure, an annular concave ring 23 may be provided on the end surface of one end of the cylindrical body 2 where the lock ring 25 is mounted. An annular groove 24 is arranged on the outer circumference of the annular concave ring 23, and a locking bar 26 corresponding to the shape and size of the groove 24 can be arranged on the outer circumference of the annular concave ring 23. The lock ring 25 can be provided. The diameter of the ring is the same as the diameter of the annular concave ring 23, and can be embedded in the annular concave ring 23. After the lock ring 25 is mounted in the annular concave ring 23, the locking bars 26 on the lock ring 25 can be snapped into the grooves 24, respectively. With the above structure, the lock rotation effect of the lock ring 25 and the cylindrical body 2 can be achieved, and the lock ring 25 can be replaced after the lock ring 25 is worn. With this solution it is possible to increase the service life of the locking element. In addition, the present embodiment can also replace the locking structure of the locking washer 1 and the lock ring 25 in different vibration environments in order to increase or maintain a certain locking effect and improve the application of the locking piece in accordance with actual conditions.

Figure 5:
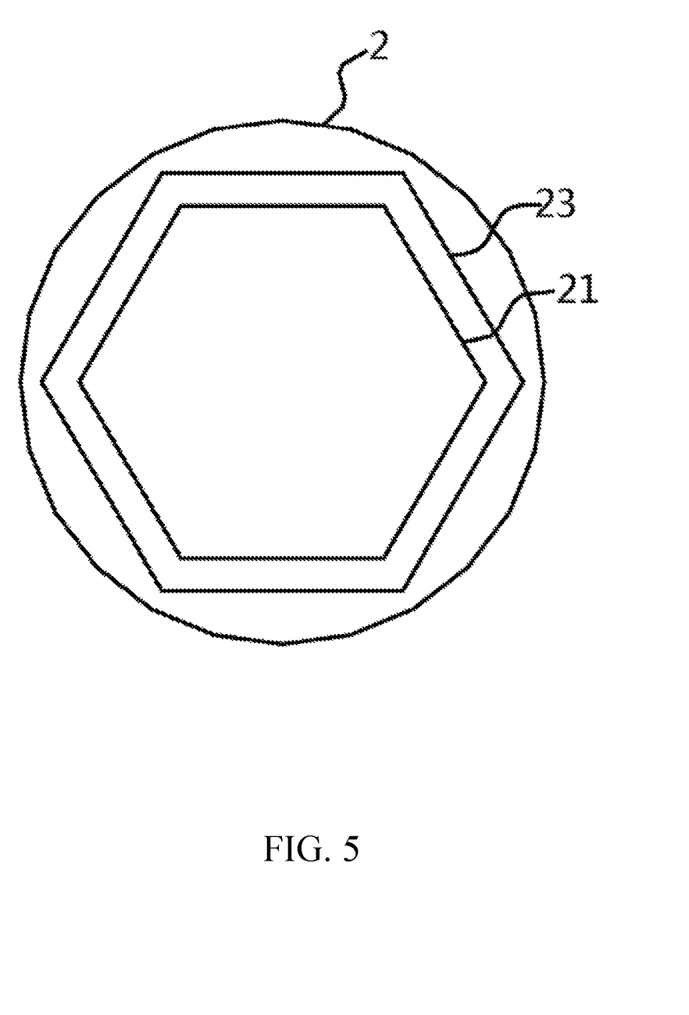
FIG. 5 is a schematic view of a cylinder structure according to another embodiment of the present disclosure.
Figure 6:
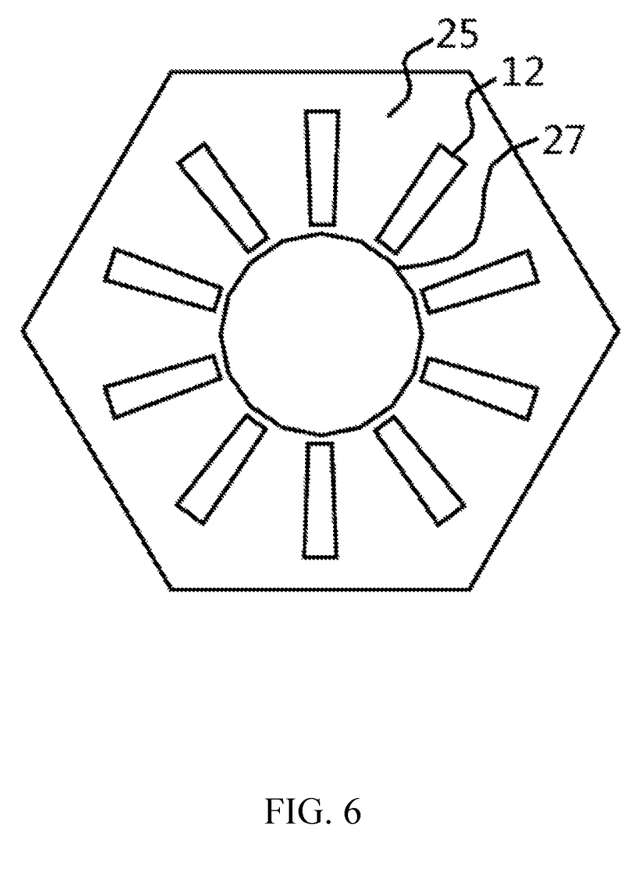
FIG. 6 is a structural schematic diagram of a locking ring engaged with the cylinder shown in FIG. 5.

As shown in FIGS. 5 and 6, in another embodiment, the replaceable lock ring 25 may also be configured such that: at the end of the cylindrical body 2 where the lock ring 25 is installed, a annular concave ring 23 is provided. The outer circumference of the annular concave ring 23 is an inner polygon, and the outer circumference of the lock ring 25 is an outer polygon corresponding to the outer circumferential shape of the annular concave ring 23. After the lock ring 25 is installed in the annular concave ring 23, the annular concave The annular concave ring 23 may define the rotation of the lock ring 25 in the circumferential direction by the inner polygon. The structure of this embodiment is more convenient for the installation of the lock ring 25 and the cylindrical body 2.

Heretofore, those skilled in the art will recognize that although a plurality of exemplary embodiments of the present disclosure have been shown and described in detail herein, it is possible to disclose the present disclosure without departing from the spirit and scope of the present disclosure. The content directly determines or infers many other variations or modifications consistent with the principles of the invention. Therefore, the scope of the present disclosure should be understood and determined to cover all such other variations or modifications.

The above descriptions are merely preferred embodiments of the present disclosure, and certainly cannot be used to limit the scope of the claims of the present disclosure. Equivalent changes made according to the claims of the present disclosure still fall within the scope of the present disclosure.

What is claimed is:

1. A threaded connection anti-loosening locking device, comprising:
   a bolt having a screw with an external thread;
   a nut having an internal thread and forming a threaded connection with the threaded screw;
   a locking element having a cylindrical body with a through hole, an axial cross-sectional shape and size of the through hole corresponding to an axial cross-sectional shape and size of the outer surface of the nut, and a locking ring mounted at the cylindrical body being provided at one end of the cylindrical body, the center of the locking ring being provided with a round hole with the same outer diameter as the screw, and a gripping pattern being arranged on a side of the lock ring away from the cylindrical body; and
   a lock washer having a through hole arranged at its center whose diameter is the same as an outer diameter of the screw and having a gripping pattern on one side of the locking washer that is in contact with the gripping pattern of the locking ring for preventing relative rotation.

2. The threaded connection anti-loosening locking device according to claim 1, wherein an axial length of the through-hole of the cylindrical body is greater than or equal to half of a length of the nut in an axial direction or an axial length thereof.

3. The threaded connection anti-loosening locking device according to claim 1, wherein the outer surface of the cylinder body is cylindrical, and the locking member is a circular member corresponding to the outer shape of the cylinder body.

4. The threaded connection anti-loosening locking device according to claim 1, wherein the gripping pattern on the locking ring includes a plurality of stepped gear stairs uniformly distributed around the circular hole and each stepped gear stair includes a ramp that extends upwardly from the surface of the locking ring, and a section that is perpendicular to the surface of the locking ring from the top of the ramp.

5. The threaded connection anti-loosening locking device according to claim 4, wherein the gripping pattern on the locking washer corresponds to the shape of a stepped gear stair on the locking ring, and the ramped surfaces of the stepped gear stair have the same rising angle but in opposite rotation directions.

6. The threaded connection anti-loosening locking device according to claim 1, wherein an outer surface of the nut is hexagonal, and an axial cross-sectional shape of the through hole of the locking member has a hexagonal shape to match with the outer surface of the nut.

7. The threaded connection anti-loosening locking device according to claim 1, wherein the locking member is away from one side of the cylinder, and is provided with a gripping pattern that improves the ability to grip a substrate.

8. The threaded connection anti-loosening locking device according to claim 7, wherein the gripping pattern comprises a plurality of wedge-shaped racks formed by outward projection of the surface of the locking member and the wedge-shaped racks are evenly distributed on the surface of the locking washer, and the axis of each wedge-shaped rack passes through the center of the locking washer.

9. The threaded connection anti-loosening locking device according to claim 1, wherein an annular concave ring is provided at an end of the cylinder body where the locking ring is mounted, and a groove is disposed at each interval on an inner circumference of the annular concave ring, and a locking bar corresponding to the shape and size of the groove is arranged on the outer circumference of the locking ring, whereby the lock is provided with the locking bars being snapped into the grooves, respectively, after the locking ring is installed in the annular concave ring.

10. The threaded connection anti-loosening locking device according to claim 1, wherein an annular concave ring is disposed at an end of the cylinder body at which the locking ring is mounted, and an outer circumference of the annular concave circle is an internal polygon and an outer circumference of the locking ring is an outer polygon corresponding to the inner circumferential shape of the annular concave ring, and after the locking ring is installed in the annular concave ring, the annular concave circle is defined by the inner polygon to prevent the rotation of the locking ring in the circumferential direction.

\* \* \* \* \*